United States Patent
Kosslyn et al.

(10) Patent No.: US 8,856,958 B1
(45) Date of Patent: Oct. 7, 2014

(54) PERSONALIZED CONTENT ACCESS PROMPT

(75) Inventors: Justin Lewis Kosslyn, Mountain View, CA (US); Sucharitha Vasudevan, Karnataka (IN)

(73) Assignee: Google Inc., Mountain View, CA (US)

( * ) Notice: Subject to any disclaimer, the term of this patent is extended or adjusted under 35 U.S.C. 154(b) by 17 days.

(21) Appl. No.: 13/591,219

(22) Filed: Aug. 21, 2012

(51) Int. Cl.
*G06F 7/04* (2006.01)

(52) U.S. Cl.
USPC .............................................. 726/28; 726/27

(58) Field of Classification Search
CPC ......... G06Q 30/02; G06F 21/31; G06F 21/10; G06F 21/6218; G06F 17/30902
USPC .......................................................... 726/28
See application file for complete search history.

(56) References Cited

U.S. PATENT DOCUMENTS

| | | | |
|---|---|---|---|
| 8,219,752 B1 * | 7/2012 | Jenkins et al. ................ | 711/118 |
| 8,533,350 B2 * | 9/2013 | Jakobsson et al. ............ | 709/229 |
| 2002/0184496 A1 * | 12/2002 | Mitchell et al. ............... | 713/168 |
| 2005/0119939 A1 * | 6/2005 | Henning et al. ................ | 705/14 |
| 2008/0140509 A1 * | 6/2008 | Amjadi .......................... | 705/10 |
| 2011/0093790 A1 * | 4/2011 | Maczuba ...................... | 715/745 |

* cited by examiner

*Primary Examiner* — Kambiz Zand
*Assistant Examiner* — Ghodrat Jamshidi
(74) *Attorney, Agent, or Firm* — McDermott Will & Emery LLP

(57) ABSTRACT

Computer-implemented methods for determining whether to prompt a user to sign in to view content are provided. In one aspect, a method includes receiving a request from a non-authenticated device to view content, and determining whether the device comprises a personalized content module indicating whether the device has previously been authenticated to view the content in a personalized format. The method also includes providing, for display, a notification to the device to provide authentication when the personalized content module indicates that the device has previously been authenticated to view the content in a personalized format. Systems, graphical user interfaces, and machine-readable media are also provided.

22 Claims, 5 Drawing Sheets

PERSONALIZED CONTENT ACCESS PROMPT

BACKGROUND

The present disclosure generally relates to the transmission of data over a network, and more particularly to the use of a computing device to communicate over a network.

Online content providers often allow users to personalize content to their own preferences. For example, news content providers allow users to select what types of news and from what news sources they wish to view content. Image content providers allow users to select, for example, the size and format in which users choose to view their images. Such personalized access is usually associated with a user account. When the user is not signed in to the user account, the user does not have access to the personalized content.

If a user that has personalized content is not aware that the user is not signed in to the user account, then the user will also be unaware why the user is not viewing the user's signed in personalized content (e.g., versus any content, personalized or not, viewable from not being signed in). Such a user may believe the content the user is viewing is erroneous. On the other hand, if a user that does not have personalized content is not aware that the user is not signed in to the user account, then the user will not be concerned about viewing personalized content. Such a user will likely not believe the content the user is viewing is erroneous.

SUMMARY

According to one aspect of the disclosure, a computer-implemented method is provided. The method includes receiving a request from a non-authenticated device to view content, and determining whether the device includes an indicator of whether the device has previously been authenticated to view the content in a personalized format. The method also includes providing, for display, a notification to the device to provide authentication when the indicator indicates that the device has previously been authenticated to view the content in the personalized format.

These and other aspects may provide one or more of the following features, such as when the device does not include the indicator, providing a new instance of the indicator to the device for indicating whether the device authenticates to view the content in the personalized format. The device can be authenticated to view the content in the personalized format by providing an authentic user name and password. The indicator can be configured to remain perpetually valid in a memory of the device. The indicator can include a bit value that changes when the device initially authenticates to view the content after the indicator is stored in the memory of the device. The notification can be dismissed from being displayed on the device for subsequent requests to view the content in the personalized format. The notification can be configured to be displayed in a personalized portion of the personalized content.

According to another aspect of the disclosure, a system for determining whether to prompt a user to sign in to view content is provided. The system includes a memory including a request from a non-authenticated device to view content, and a processor. The processor is configured to execute instructions to determine whether a memory of the device includes an indicator of whether the device has previously been authenticated to view the content in a personalized format, and provide, for display, a notification to the device to provide authentication when the indicator indicates that the device has previously been authenticated to view the content in the personalized format.

These and other aspects may provide one or more of the following features, such as when the device does not include the indicator, the processor is configured to provide a new instance of the indicator to the device for indicating whether the device authenticates to view the content in the personalized format. The device can be authenticated to view the content in the personalized format by providing an authentic user name and password. The indicator can be configured to remain perpetually valid in a memory of the device. The indicator can include a bit value that changes when the device initially authenticates to view the content in the personalized format after the personalized content module is stored in the memory of the device. The notification can be dismissed from being displayed on the device for subsequent requests to view the content in the personalized format. The notification can be configured to be displayed in a personalized portion of the personalized content.

According to a further aspect of the disclosure, a user interface for determining whether to prompt a user to sign in to view content is provided. The user interface includes content viewable in a personalized format, and a notification to provide authentication to view a personalization of the personalized content that is displayed when an indicator in memory of a device indicates that the device has previously been authenticated to view the content in the personalized format.

These and other aspects may provide one or more of the following features, such as the device is authenticated to view the content in the personalized format by providing an authentic user name and password to a server comprising the personalized content. According to another feature, the indicator includes a bit value that changes when the device initially authenticates to view the content in the personalized format after the personalized content module is stored in the memory of the device. According to yet another feature, the notification can be dismissed from being displayed for subsequent requests to view the content in the personalized format. According to a further feature, the notification is displayed in a personalized portion of the personalized content.

These and other aspects may provide one or more of the following advantages. Users are quickly and prominently informed as to whether content the user has personalized is available but not being displayed to the user. As a result, a likelihood that a user having personalized content inadvertently view non-personalized content and believe that the non-personalized content is personalized is reduced. Additionally, users that do not have personalized content are not unnecessarily notified to access personalized content when none is available.

According to yet a further aspect of the disclosure, a machine-readable storage medium comprising machine-readable instructions for causing a processor to execute a method for determining whether to prompt a user to sign in to view content is provided. The method includes receiving a request from a non-authenticated device, and determining whether the device includes an indicator indicating whether the device has previously been authenticated to view the content in a personalized format. The method also includes providing, for display, a notification to the device to provide authentication when the indicator indicates that the device has previously been authenticated to view the content in the personalized format. The indication of whether the device has previously been authenticated to view the content in the personalized format includes a bit value in the personalized content module that is an indicator of whether the device has previously been authenticated to view the content in a personalized format, wherein the bit value changes when the device initially authenticates to view the content in a personalized format after the indicator is stored in a memory of the device.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, structures and techniques have not been shown in detail so as not to obscure the disclosure.

The disclosed system determines when to prompt a client device to sign in to a personalized content service by determining whether that client has previously signed in to the personalized content service. The system therefore avoids prompting clients to sign in if the clients have not previously signed in to the personalized content service before. Specifically, a cookie or other indicator on the client indicates whether the client has been authenticated with user name and password for the personalized content. The indicator is updated when a user provides the authenticated user name and password. The indicator does not store information on the user, but instead stores information that the client (e.g., a browser on the client) of the user has been authenticated into some account. When the client authentication with the personalized content service expires (e.g., after the user signs out of personalized content service), and the client, now no longer authenticated, attempts to view the content in a personalized format service, the server instructs the client to display a sign in prompt for the personalized content service so that the client can view personalized content. On the other hand, if the indicator indicates the client has not previously been authenticated with the personalized content service, the server does not instruct the client to provide the prompt.

Although many examples provided herein describe a user's client information being in memory (e.g., whether the client, but not the user, has signed in to the personalized content service), the user can, at any time, delete the information from memory and/or opt out of having the information in memory. Additionally, the user can, at any time, adjust appropriate privacy settings to selectively limit the types of information in memory. In many examples, the information does not include and/or share the specific identification of the user (e.g., the user's name).

Figure 1:
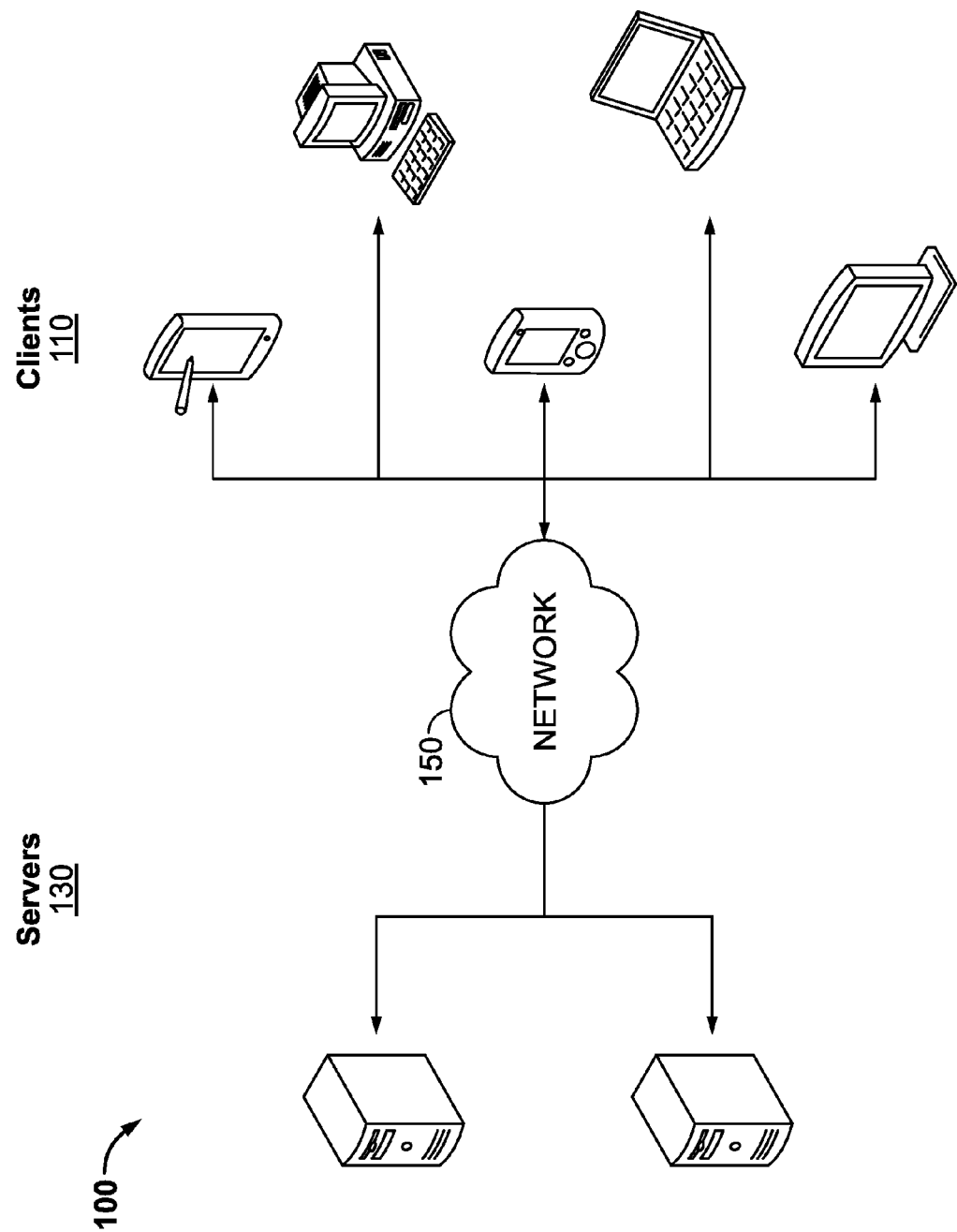
FIG. 1 illustrates an example architecture for determining whether to prompt a user to sign in to view content.

FIG. 1 illustrates an example architecture 100 for determining whether to prompt a user to sign in to view content. The architecture 100 includes servers 130 and clients 110 connected over a network 150.

One of the many servers 130 is configured to host personalized content and user personalization preferences for the content. For purposes of load balancing, multiple servers 130 can host the personalized content and user personalization preferences for the content. As discussed herein, the personalized content can be any content that can be personalized by a user, such as, for example, news content, photo albums, images, web portals, video sharing services, and online document management services. The personalization preferences include the preferences for one or many users on how the personalized content is to be personalized. The personalization preferences for each user are associated with a user profile, which can be accessed by the user using a client 110 to provide appropriate authentication (e.g., name and password) to the server 130. For example, news content can be personalized by a user selecting news sources, layout format, topics, identifying a region that is local to the user for local news, and providing news viewing shortcuts, and those personalization prefers can be available on the server 130. In certain aspects, some personalization services may be available to signed-out users, in which case the personalization preferences will be tied to a preferences indicator of the client 110.

The servers 130 can be any device having an appropriate processor, memory, and communications capability for hosting the personalized content and user personalization preferences for the content. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
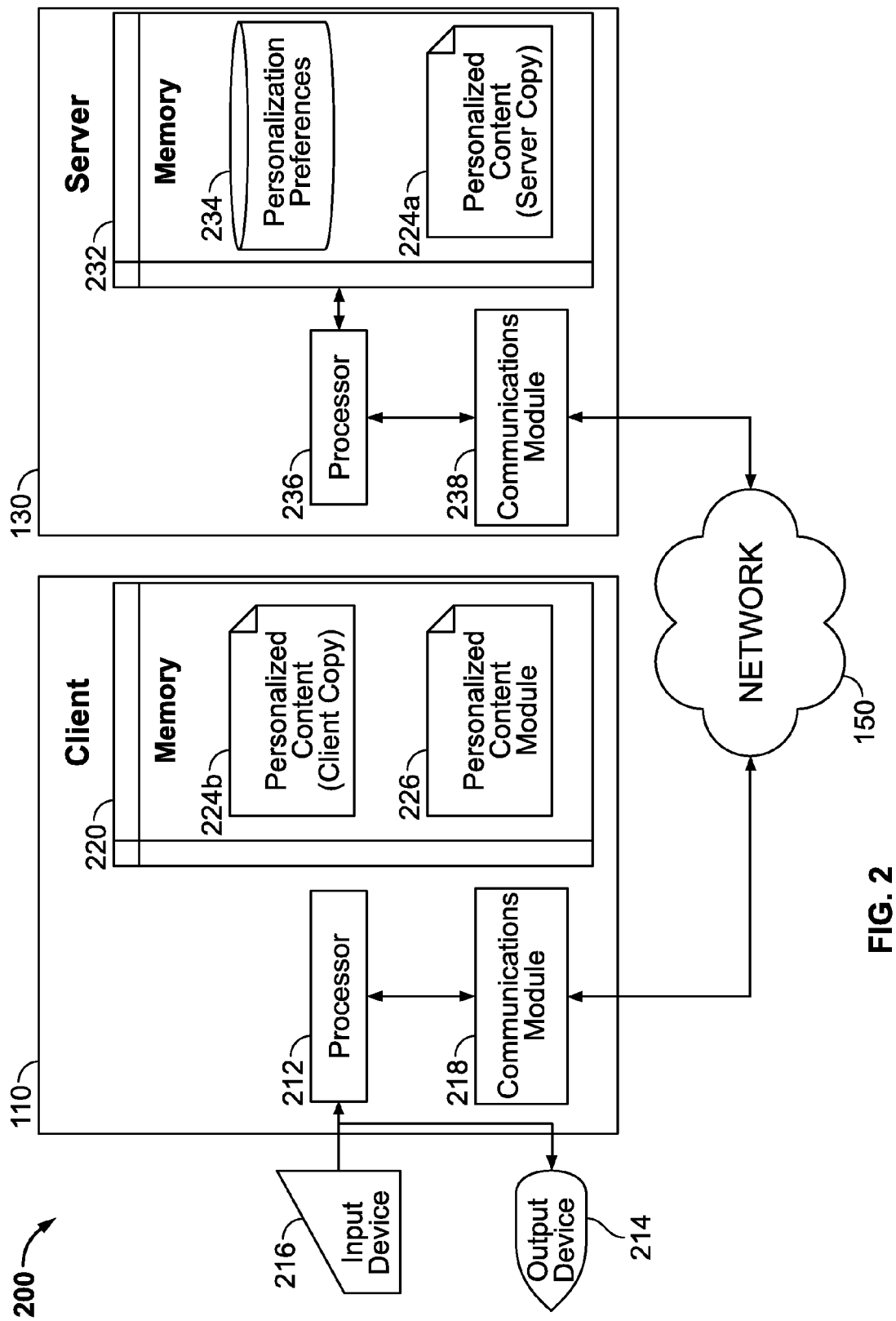
FIG. 2 is a block diagram illustrating the example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes a server copy of personalized content 224a and personalization preferences 234 for the personalized content 224a. The processor 236 of the server 130 is configured to execute instructions, such as instructions physically coded into the processor 236, instructions received from software in memory 240, or a combination of both. For example, the processor 236 of the server 130 executes instructions to receive a request from the client 110, a non-authenticated device, to view content. The request can be sent by the communications module 218 of the client 110 over the network 150 to the communications module 238 of the server 130 for processing by the server processor 236.

The processor 236 of the server 130 is also configured to determine whether the client 110 includes a personalized content module 226 (or "indicator") configured to identify whether the client 110 has previously been authenticated to view the content in a personalized format 224a. Each personalized content module 226 includes a unique identifier associated with the client 110 so that the server 130 can associate each personalized content module 226 with a unique client 110. The personalized content module 226 can be, for example, an indicator (e.g., HTTP cookie, web cookie, or browser cookie) available in the memory 220 of the client 110 that includes a bit value that indicates whether the client 110 has previously been authenticated to view the content in a personalized format 224a. In certain aspects, the bit value can be available in the memory 232 of the server 130, in which case the bit value is tied to the unique identifier of the personalized content module 226 of the client 110. The bit value changes when the client 110 initially authenticates to view the content in a personalized format 224a after the personalized content module 226 is first made available in the memory 220 of the client 110. The client 110 can, for example, have viewed the personalized content by the client 110 providing appropriate authentication (e.g., by providing an authentic user name and password using input device 216) to the server 130 and then the client 110 downloading a copy of the personalized content 224a over the network 150 and storing the personalized content 224a as a client copy 224b in a memory 220 of the client 110. In certain aspects, the bit can represent more than the two states of whether the client 110 has authenticated to view the content in a personalized format 224a. For example, the value can represent three states: (1) the client 110 has not signed in to an account, (2) the client 110 has signed into an account that is associated with personalized content, and (3) the client 110 has signed into an account that is not associated with personalized content. In the case of the third state (3), a notification can be provided to the client 110 for display on the output device 214 to encourage the client 110 to sign into an account and personalize content.

When the client 110 does not include the personalized content module 226, the server 130 can provide a new instance of the personalized content module 226 over the network 150 to the client 110 to be made available in memory 220 for determining whether the client 110 authenticates to view the content in a personalized format 224a. In certain aspects, the personalized content module 226 is configured to remain perpetually valid in the memory of the client 110.

When the client 110 includes the personalized content module 226, the processor 236 of the server 130 identifies, based on the personalized content module 226, whether the client 110 has previously been authenticated to view the content in a personalized format 224a. The identification of whether the client 110 has previously been authenticated to view the content in a personalized format 224a can be, for example, the server 130 determining the value of the bit in the personalized content module 226 to determine if the value indicates the client 110 has previously been authenticated to view the content in a personalized format 224a.

The processor 130 can further be instructed to provide, for display (e.g., on output device 214), a notification to the client 110 to provide authentication when the identification indicates that the client 110 has previously been authenticated to view the content in a personalized format 224a but is not currently authenticated to view the content in a personalized format 224a. The notification can be dismissed from being displayed on the output device 214 of the client 110 for subsequent requests to view the content in a personalized format 224a. The notification is configured to be displayed in a personalized portion of the personalized content 224b once downloaded and viewed on the client 110.

Figure 3:
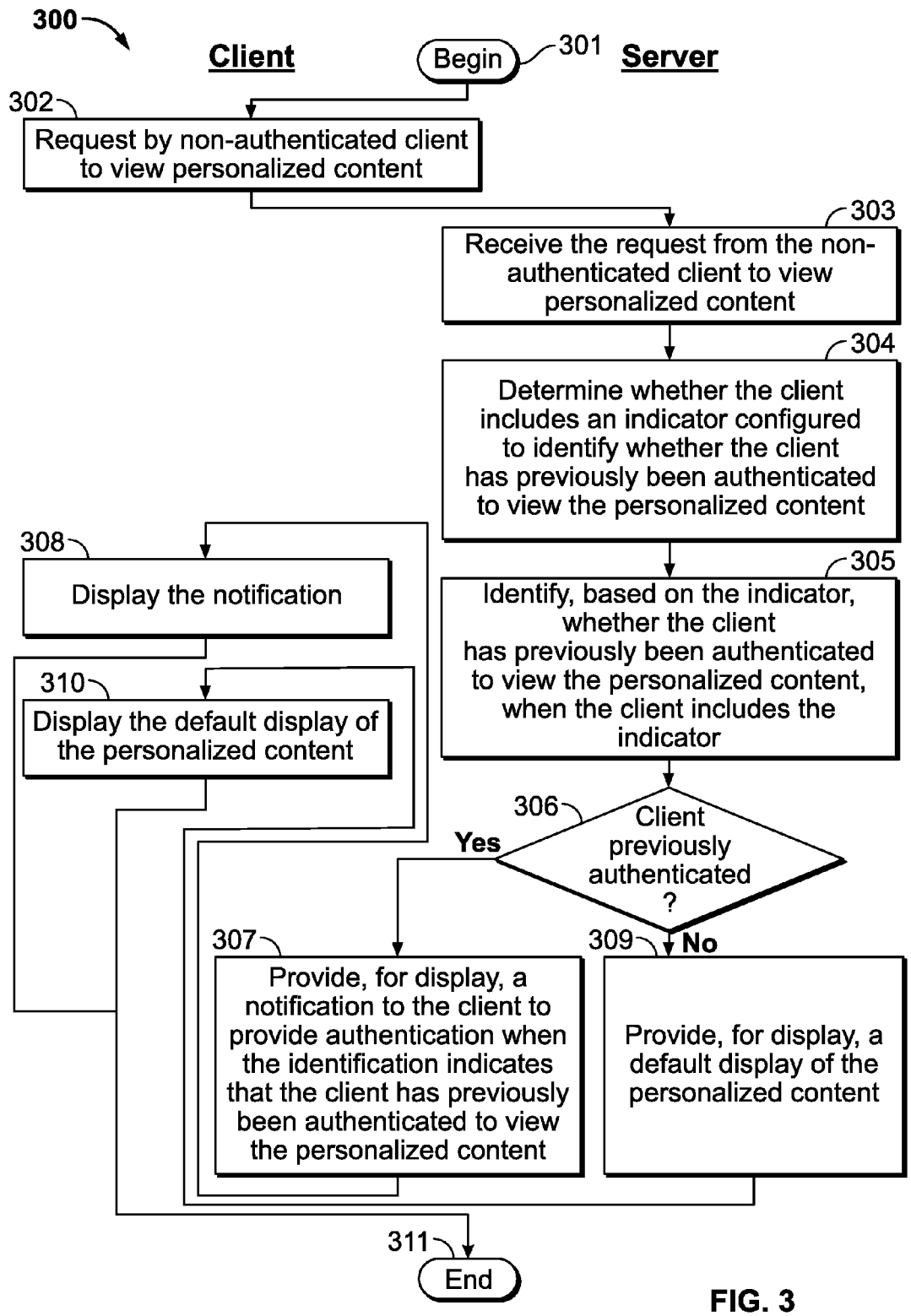
FIG. 3 illustrates an example process for determining whether to prompt a user to sign in to view content using an example client and server of FIG. 2.

FIG. 3 illustrates an example process 300 for determining whether to prompt a user to sign in to view content using the example client 110 and server 130 of FIG. 2. The example process 300 refers to a web browser application on the client 110 and personalized news content 224a displayed as part of a web page stored on a server 130. In the example, a user has previously personalized the personalized news web page 224a after having provided an authenticated username and password to the server 130. The authentication, however, has recently expired. The client 110, therefore, appears as unauthenticated to the server 130, but the user is not aware of it.

Figure 4A:
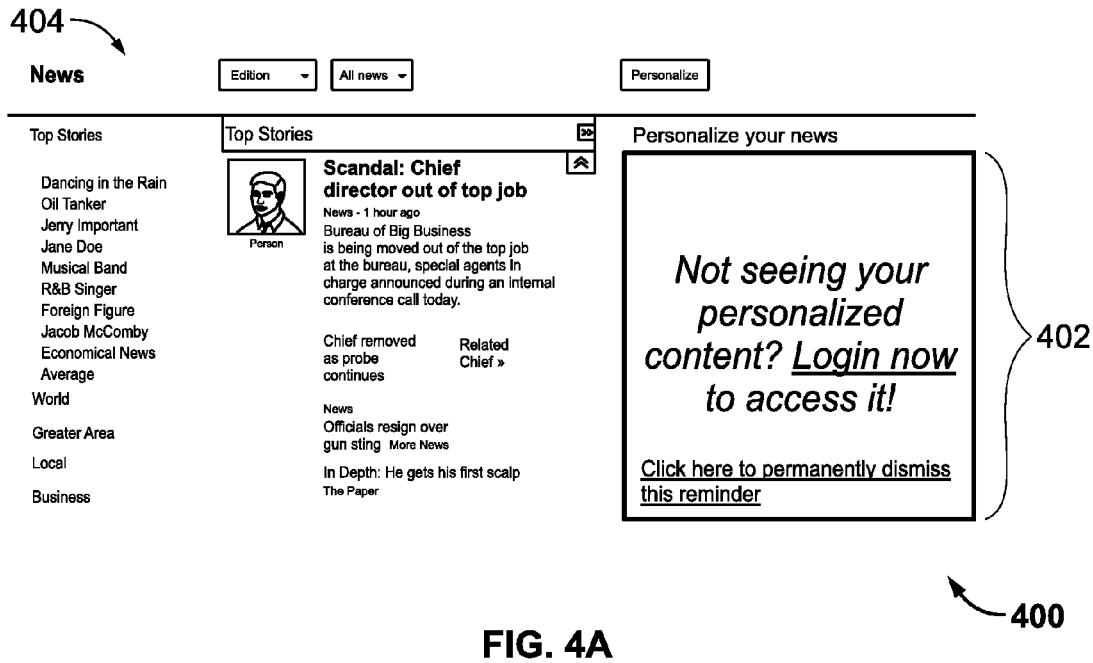
FIGS. 4A and 4B are example screenshots associated with the example process of FIG. 3.
Figure 4B:
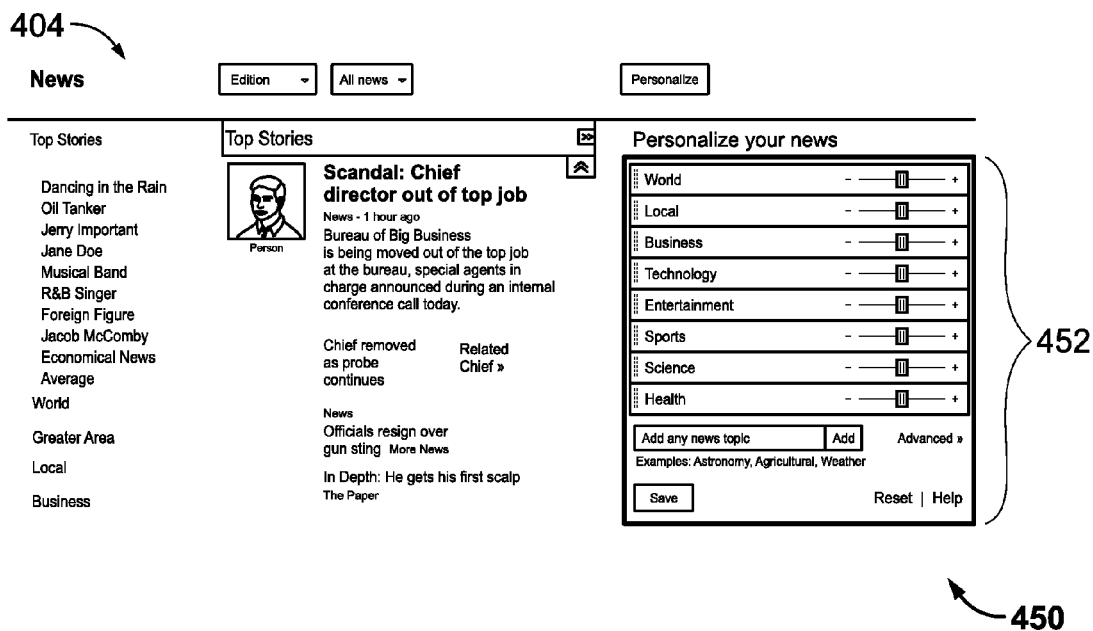

The process 300 begins by proceeding from step 301 when a user loads the web browser on the non-authenticated client 110 for viewing personalized content, to step 302, when the web browser requests to view the personalized news web page 224a from the server 130. In step 303, the server 130 receives the request to view the personalized news web page 224a from the non-authenticated client 110, and in step 304 determines the client includes an HTTP indicator that identifies whether the client 110 previously signed in to the personalized news web page 224a. In step 305, the server 130 identifies from the HTTP indicator that the client 110 has previously signed in to the personalized news web page 224a, and in step 306 the server 306 decides how to proceed in response to the identification of step 305. Because the client has been previously authenticated, in step 307 the server 130 sends a copy of the personalized news web page 224a to the client 110 without personalized content to display, but with a notification to prompt the client 110 to sign in to the personalized news web page 224b. In step 308, the client copy of the personalized news web page 224b is displayed with the notification, as illustrated in FIG. 4A. FIG. 4A is an example screenshot 400 of the personalized news web page 224a as displayed in the web browser of the client 110. The personalized news web page 224a includes generic news content 404 along with a notification prompt 402 to the client to authenticate with the server 130 to view content. The prompt 402 is displayed in a personalized news content area and further includes an ability to be dismissed. The prompt 402 can be displayed in other content areas, such as between a generic content area and between a personalized content area. The process 300 then ends. If, however, the client 110 was determined in step 306 not to have previously signed in to the personalized news web page 224a, then the server 130 would have provided a default display of the personalized content to the client 110 in step 309, for display on the client in step 310. The personalized news content area 452 of the default display would appear differently, as illustrated in FIG. 4B. FIG. 4B is an example screenshot 450 of a default display that includes personalized news content 404 and the ability to personalize news 452 for a user that appears to the server 130 to have not previously used the personalized news web page 224a.

Figure 5:
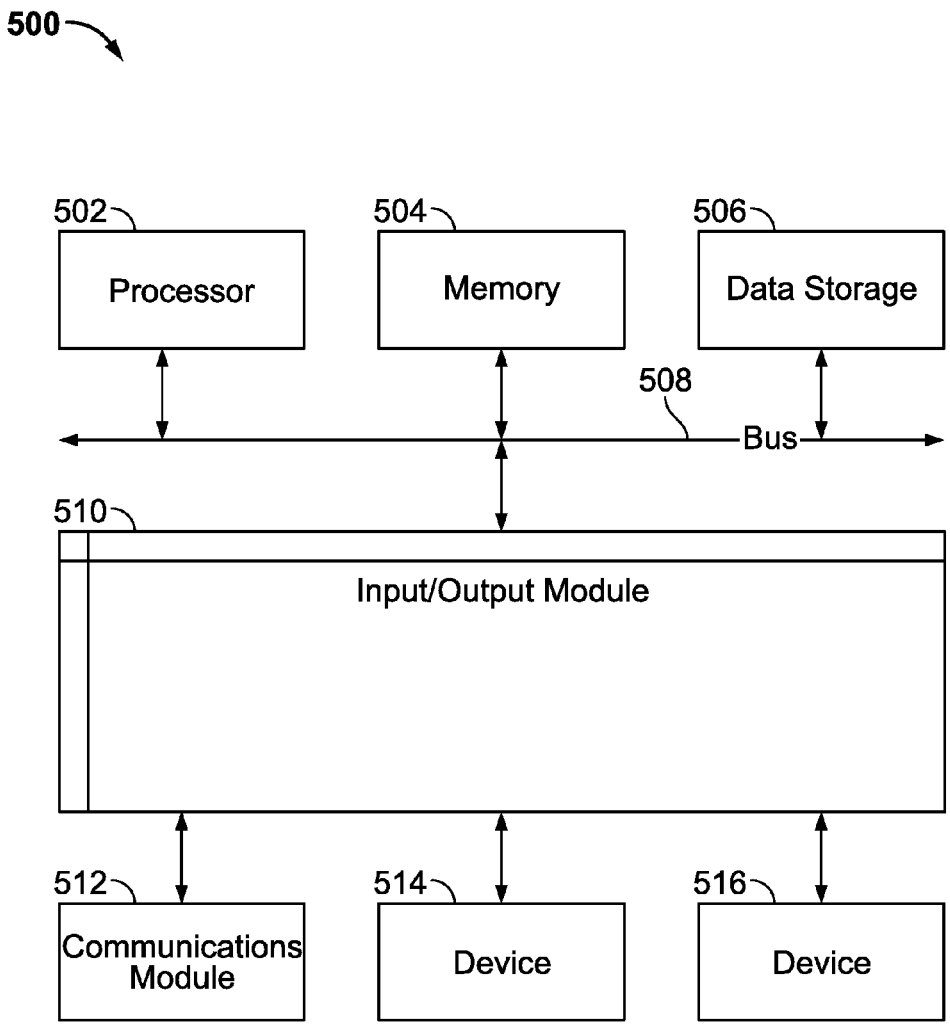
FIG. 5 is a block diagram illustrating an example computer system with which the clients and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method comprising:
   receiving a request from a non-authenticated application on a device to view content;
   determining whether the device comprises an indicator representative of one of three states comprising: (1) the device has not previously signed in to a user account configurable for viewing the content in a personalized format, (2) the device has previously signed into a user account configured for viewing the content in the personalized format, and (3) the device has previously signed into a user account that is not configured for viewing the content in the personalized format; and
   providing, for display, a notification to the device to provide authentication for the non-authenticated application when the indicator indicates that the device has previously signed into a user account configured for viewing the content in the personalized format, the notification comprising an indicator that providing authentication for the non-authenticated application will permit viewing of the content in the personalized format for the user account.

2. The computer-implemented method of claim 1, wherein, when the device does not comprise the indicator, providing a new instance of the indicator to the device.

3. The computer-implemented method of claim 1, wherein the device is authenticated to view the content in a personalized format by providing an authentic user name and password.

4. The computer-implemented method of claim 1, wherein the indicator is configured to remain perpetually valid in a memory of the device.

5. The computer-implemented method of claim 1, wherein the indicator comprises a bit value that changes when the device initially authenticates to view the content after the indicator is stored in the memory of the device.

6. The computer-implemented method of claim 1, wherein the notification is configured to be dismissed from being displayed on the device for subsequent requests to view the content in a personalized format.

7. The computer-implemented method of claim 1, wherein the notification is configured to be displayed in a personalized portion of the personalized content.

8. The computer-implemented method of claim 1, further comprising providing, for display, another notification requesting the device sign into the user account and configure the user account for viewing the content in the personalized format when the indicator indicates that the device has previously signed into the user account that is not configured for viewing the content in the personalized format.

9. A system comprising:
a memory comprising a request from a non-authenticated device to view content; and
a processor configured to execute instructions to:
  determine whether a memory of the device comprises an indicator representative of one of three states comprising: (1) the device has not previously signed in to a user account configurable for viewing the content in a personalized format, (2) the device has previously signed into a user account configured for viewing the content in the personalized format, and (3) the device has previously signed into a user account that is not configured for viewing the content in the personalized format; and
  provide, for display, a notification to the device to provide authentication when the indicator indicates that the device has previously signed into a user account configured for viewing the content in the personalized format, the notification comprising an indicator that providing authentication for the non-authenticated application will permit viewing of the content in the personalized format for the user account.

10. The system of claim 9, wherein, when the device does not comprise the indicator, the processor is configured to provide a new instance of the indicator to the device.

11. The system of claim 9, wherein the device is authenticated to view the content in a personalized format by providing an authentic user name and password.

12. The system of claim 9, wherein the indicator is configured to remain perpetually valid in a memory of the device.

13. The system of claim 9, wherein the indicator comprises a bit value that changes when the device initially authenticates to view the content in a personalized format after the personalized content module is stored in the memory of the device.

14. The system of claim 9, wherein the notification can be dismissed from being displayed on the device for subsequent requests to view the content in a personalized format.

15. The system of claim 9, wherein the notification is configured to be displayed in a personalized portion of the personalized content.

16. The system of claim 9, wherein the processor is further configured to execute instructions to provide, for display, another notification requesting the device sign into the user account and configure the user account for viewing the content in the personalized format when the indicator indicates that the device has previously signed into the user account that is not configured for viewing the content in the personalized format.

17. A system for determining whether to prompt a user to sign in to view content, the system comprising:
a processor configured to:
  display content viewable in a personalized format; and
  generate a notification to provide authentication to view a personalization of the personalized content that is displayed when an indicator in memory of a device indicates that the device has previously signed into a user account configured for viewing the content in the personalized format,
  wherein the indicator is representative of one of three states comprising: (1) the device has not previously signed in to a user account configurable for viewing the content in a personalized format, (2) the device has previously signed into a user account configured for viewing the content in the personalized format, and (3) the device has previously signed into a user account that is not configured for viewing the content in the personalized format,
  wherein the notification comprises an indicator that providing authentication for the non-authenticated application will permit viewing of the content in the personalized format for the user account.

18. The user interface of claim 17, wherein the device is authenticated to view the content in a personalized format by providing an authentic user name and password to a server comprising the personalized content.

19. The user interface of claim 17, wherein the indicator comprises a bit value that changes when the device initially authenticates to view the content in a personalized format after the indicator is stored in the memory of the device.

20. The user interface of claim 17, wherein the notification can be dismissed from being displayed for subsequent requests to view the content in a personalized format.

21. The user interface of claim 17, wherein the notification is displayed in a personalized portion of the personalized content.

22. A non-transitory machine-readable storage medium comprising machine-readable instructions for causing a processor to execute a method comprising:
receiving a request from a non-authenticated device to view content;
determining whether the device comprises an indicator representative of one of three states comprising: (1) the device has not previously signed in to a user account configurable for viewing the content in a personalized format, (2) the device has previously signed into a user account configured for viewing the content in the personalized format, and (3) the device has previously signed into a user account that is not configured for viewing the content in the personalized format; and
providing, for display, a notification to the device to provide authentication when the indicator indicates that the device has previously signed into a user account configured for viewing the content in the personalized format,
wherein the indicator comprises a bit value that changes when the device initially authenticates to view the content in a personalized format after the indicator is stored in a memory of the device,
and wherein the notification comprises an indicator that providing authentication for the non-authenticated application will permit viewing of the content in the personalized format for the user account.

* * * * *